(12) United States Patent
Ashar et al.

(10) Patent No.: US 10,553,096 B2
(45) Date of Patent: Feb. 4, 2020

(54) HEALTH APPLICATION FOR RESIDENTIAL ELECTRICAL SWITCH SENSOR DEVICE PLATFORM

(71) Applicant: Nuro Technologies, Inc., San Jose, CA (US)

(72) Inventors: Premal Ashar, Sunnyvale, CA (US); Vaibhavi Ashar, Sunnyvale, CA (US); George Scolaro, Sunnyvale, CA (US); Larry Nasarabadi, Livermore, CA (US)

( * ) Notice: Subject to any disclaimer, the term of this patent is extended or adjusted under 35 U.S.C. 154(b) by 0 days.

(21) Appl. No.: 15/924,123

(22) Filed: Mar. 16, 2018

(65) Prior Publication Data

US 2018/0210437 A1 Jul. 26, 2018

Related U.S. Application Data

(63) Continuation of application No. 15/249,314, filed on Aug. 26, 2016.

(60) Provisional application No. 62/473,896, filed on Mar. 20, 2017.

(51) Int. Cl.
| | |
|---|---|
| G08B 21/02 | (2006.01) |
| G08B 21/00 | (2006.01) |
| G08B 21/04 | (2006.01) |
| G05B 15/02 | (2006.01) |
| H04L 12/28 | (2006.01) |

(52) U.S. Cl.
CPC ............ *G08B 21/02* (2013.01); *G05B 15/02* (2013.01); *G08B 21/00* (2013.01); *G08B 21/04* (2013.01); *G08B 21/043* (2013.01); *G08B 21/0415* (2013.01); *G08B 21/0423* (2013.01); *G05B 2219/163* (2013.01); *G05B 2219/25011* (2013.01); *G05B 2219/25168* (2013.01); *G05B 2219/2642* (2013.01); *H04L 12/2803* (2013.01); *Y02B 70/3241* (2013.01); *Y04S 20/227* (2013.01)

(58) Field of Classification Search
None
See application file for complete search history.

(56) References Cited

U.S. PATENT DOCUMENTS

| | | | |
|---|---|---|---|
| 2003/0169171 A1* | 9/2003 | Strubbe | G08B 21/0423 340/573.1 |
| 2011/0137836 A1 | 6/2011 | Kuriyama et al. | |
| 2011/0156640 A1 | 6/2011 | Moshfeghi | |
| 2013/0033363 A1 | 2/2013 | Gabara | |
| 2014/0246993 A1 | 9/2014 | Catalano et al. | |
| 2014/0324527 A1 | 10/2014 | Kulkarni et al. | |
| 2014/0324615 A1* | 10/2014 | Kulkarni | H04W 4/70 705/26.1 |

(Continued)

*Primary Examiner* — Qing Yuan Wu
(74) *Attorney, Agent, or Firm* — Joseph L. Acayan

(57) ABSTRACT

Implementations generally relate to systems, apparatuses, and methods for a residential electrical switch sensor device platform. In some implementations, a sensor device performs operations including detecting an activity in the living space, determining contextual routine information, determining user care protocol information, and determining an occurrence of an adverse health event. In response to the occurrence of the adverse health event, the sensor device performs operations including one or more of sending a notification to one or more destinations based on the adverse health event and activating one or more surveillance devices based on the adverse health event.

20 Claims, 7 Drawing Sheets

(56) References Cited

U.S. PATENT DOCUMENTS

| | | |
|---|---|---|
| 2015/0096352 A1 | 4/2015 | Peterson et al. |
| 2016/0149720 A1 | 5/2016 | Hatae et al. |
| 2016/0189532 A1 | 6/2016 | Malhotra et al. |
| 2018/0122209 A1* | 5/2018 | Jefferson ............ G08B 21/0423 |

* cited by examiner

HEALTH APPLICATION FOR RESIDENTIAL ELECTRICAL SWITCH SENSOR DEVICE PLATFORM

CROSS REFERENCES TO RELATED APPLICATIONS

This application is a continuation of U.S. patent application Ser. No. 15/249,314, entitled RESIDENTIAL SENSOR DEVICE PLATFORM, filed on Aug. 26, 2016, which claims priority from U.S. Provisional Patent Application No. 62/215,162, entitled RESIDENTIAL SENSOR DEVICE PLATFORM, filed on Sep. 8, 2015, and claims priority from U.S. Provisional Patent Application No. 62/473,896, entitled HEALTH APPLICATION FOR RESIDENTIAL ELECTRICAL SWITCH SENSOR DEVICE PLATFORM, filed on Mar. 20, 2017, which are hereby incorporated by reference as if set forth in full in this application for all purposes.

BACKGROUND

Home automation has been a long-term desire. Control systems enable aspects of a home such as lighting to be controlled. However, cost-effective and user-friendly home automation is still far away. Present home automation systems are expensive, hard to install, and difficult to update. Such home automation systems typically require a user to understand complicated and difficult instructions to control aspects of a home.

SUMMARY

Implementations generally relate to systems, apparatuses, and methods for a health application for a residential electrical switch sensor device platform. In some implementations, a sensor device performs operations including detecting an activity in the living space, determining contextual routine information, determining user care protocol information, and determining an occurrence of an adverse health event. In response to the occurrence of the adverse health event, the sensor device performs operations including one or more of sending a notification to one or more destinations based on the adverse health event and activating one or more surveillance devices based on the adverse health event.

Other aspects and advantages of the described implementations will become apparent from the following detailed description, taken in conjunction with the accompanying drawings, illustrating by way of example the principles of the described implementations.

DETAILED DESCRIPTION

Implementations generally relate to systems, apparatuses, and methods of a residential electrical switch sensor device platform. As described in more detail below, various implementations of the residential sensor device platform provide an infrastructure within and around a residence that includes sensor-enabled devices such as medical devices within rooms of the residence, as well as sensor-enabled devices exterior to the residence (e.g., outdoor lighting, camera devices, medical devices, etc.). Note that the reference to the phrase "living space" may include indoor and outdoor spaces, depending on the particular implementations. Furthermore, in some implementations, the residential sensor device platform provides learning of common usage patterns and/or contextual routine information by tracking and learning of routine and pattern-based activity of one or more persons. Such contextual routine information may be used to automatically configure home automation in order to determine the occurrence of adverse health events in a home. Some implementations provide the sensing of motion or activity, temperature, and daylight. As described in more detail herein, sensor device 120 detects various activities and determines various aspects of activities without the use of a camera. Further, some implementations provide health-related features, autonomous and networked operation, and cloud intelligence.

As described in more detail herein, implementations provide distributed decision making intelligence at each sensor device for day-to-day use, as well as a network for advanced analytics and pattern and behavior learning. Implementations also provide an intelligent wireless mesh that is self-healing, self-learning, and expandable. Implementations also provide sensor devices in each room or living area of a residency, as well as external to a residency, where the sensor devices provide activity tracking, ambient light, temperature, energy metering, camera, air quality, carbon monoxide (CO) detection, etc. Implementations also provide an efficient, cost-effective, and user-friendly home Internet of Things (IoT) platform including ubiquitous digital, plug and play sensing, stand-alone operation, Wi-Fi mesh, distributed algorithms, self-learning, self-healing, etc.

Figure 1:
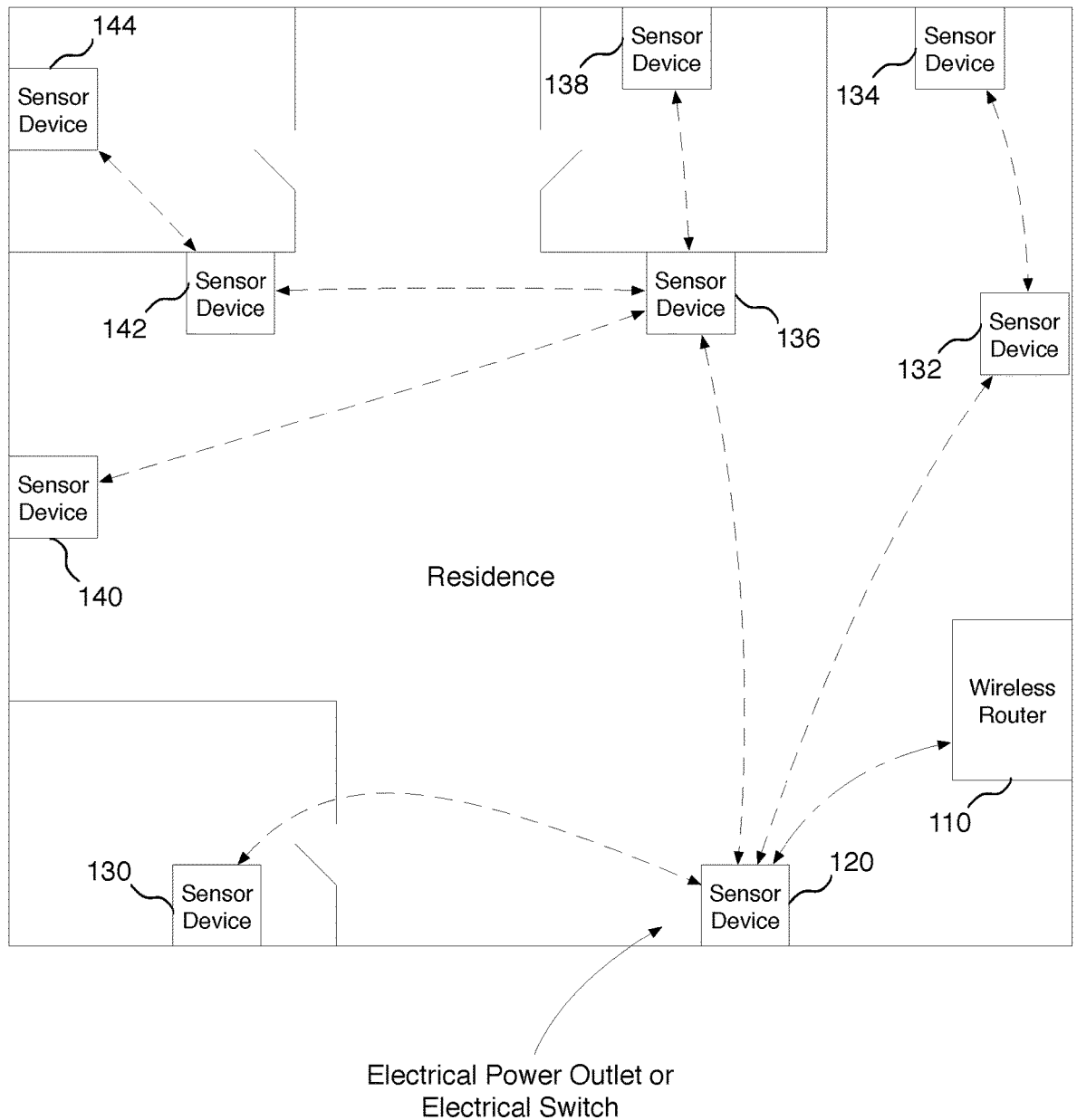
FIG. 1 illustrates a block diagram of an example residential sensor device platform, according to some implementations.

FIG. 1 illustrates a block diagram of an example residential sensor device platform 100, according to some implementations. In some implementations, the residential sensor device platform 100 includes a wireless router 110 and multiple sensor devices 120, 130, 132, 134, 136, 138, 140, 142, and 144. In various implementations, sensor devices 120, 130, 132, 134, 136, 138, 140, 142, and 144 form a wireless mesh network. In various implementations, at least one sensor of sensor devices 120, 130, 132, 134, 136, 138, 140, 142, and 144 maintains a communication link with wireless router 110.

In various implementations, sensor devices 120, 130, 132, 134, 136, 138, 140, 142, and 144 may be a part of and/or integrated with a stationary device in a residence. Such a stationary device may be an electrical switch such as a light switch, a power outlet, or other stationary devices. While implementations are described herein in the context of wall mounted stationary devices, these implementations and other also apply to other types of stationary devices (e.g., table top devices or other surface top devices, as well as appliances).

In some implementation, one sensor device of sensor devices 120, 130, 132, 134, 136, 138, 140, 142, and 144 is operative as a master sensor device, which maintains the communications link with wireless router 110. As shown, in this particular implementation, sensor device 120 maintains the communication link with wireless router 110. As such, sensor device 120 may be referred to as a master sensor device. The other sensor devices 130, 132, 134, 136, 138, 140, 142, and 144 may be referred to as slave sensor devices.

In various implementations, the sensor device that is operative as the master sensor device may change over time. For example, as described in more detail below, if a master sensor device fails, another sensor device may be selected from among the sensor devices to be operative as the new master sensor device.

In some implementations, the non-master sensor devices 130, 132, 134, 136, 138, 140, 142, and 144 form a wireless mesh network. In various implementations, the master sensor device (e.g., sensor device 120) is also a part of the wireless mesh network. For example, in this case, master sensor device 120 and non-master sensor devices 130, 132, 134, 136, 138, 140, 142, and 144 form a wireless mesh network.

In some implementations, other devices (e.g., a mobile device, third-party device, etc.) may also be a part of the wireless mesh network. In some implementations, such other devices may join the wireless mesh network based on authentication. In some implementations, authentication may be controlled with layer two (L2) MAC pre-authorization for network access. In some implementations, authentication may be controlled by higher-level cloud authentication to enable services.

As shown in FIG. 1, in various implementations, each of non-master sensor devices 130, 132, 134, 136, 138, 140, 142, and 144 are either directly coupled to master sensor device 120, or are indirectly coupled to master sensor device 120 through another of the non-master sensor devices. In some implementations, the wireless mesh network operates over at least one link or interface that is different from a link or interface that is the communication link between master sensor device 120 and wireless router 110.

In various implementations, residential sensor device platform 100 is self-healing. For example, any sensor device may function as a master sensor device. If a particular master sensor device becomes inoperable, another sensor device may take over as the master sensor device. In other words, the role of a master sensor device may change over time. In some implementations, the master sensor device may be the sensor device closest to the wireless router. In some implementations, the master sensor device may be the sensor device that first detects a motion or activity.

As shown by the exemplary residential sensor device platform 100 of FIG. 1, sensor devices 130, 132, and 136 are directly coupled to master sensor device 120. Furthermore, as shown, sensor devices 134, 140, and 142 are indirectly coupled to master sensor device 120 through sensor devices 130, 132, and 136. Sensor devices 130, 132, and 136 can be designated as first order wireless mesh network nodes that are one wireless hop from master sensor device 120. Sensor devices 134, 138, 140, and 142 may be designated as second order wireless mesh nodes that are two wireless hops from master sensor device 120. Furthermore, sensor device 144 is indirectly coupled to the master sensor device through sensor devices 142, and can be designated as a third order wireless mesh node that is three wireless hops from master sensor device 120.

In various implementations, the sensor device may detect not only sensed occupancy but may also detect activity, and distinguish among different objects such as humans, pets, robots, appliances, machinery, etc. For example, the sensor device may determine room usage based on movement patterns, type of motion or activity, size or magnitude of motion or activity, etc. In various implementations, the sensor device may detect particular activities in human behavior that occur in the living space (e.g., walking, running, falling, etc.). Based on this activity information, the sensor device may determine if the occupant is a person, pet (e.g., dog, cat, etc.), or other object.

In some implementations, one or more processors of the one or more of the sensor devices 120, 130, 132, 134, 136, 138, 140, 142, and 144 are operative to monitor the behavior of users of the living space, to receive and store the sensed condition over time, and to analyze the sensed condition to identify user behavior. In various implementations, local decisions and control are performed due to processing at each device. In other words, there is no network dependency to perform implementations described herein. In various implementations, multiple load settings may be achieved due to sensing, decisions, and controls residing on the same device. In various implementations, one or more connections in the network may be hardwired.

In some implementations, the wireless mesh network further includes non-sensor devices that communicate with at least a portion of the sensor devices of the wireless mesh network. Such non-sensor devices can include medical devices.

Figure 2:
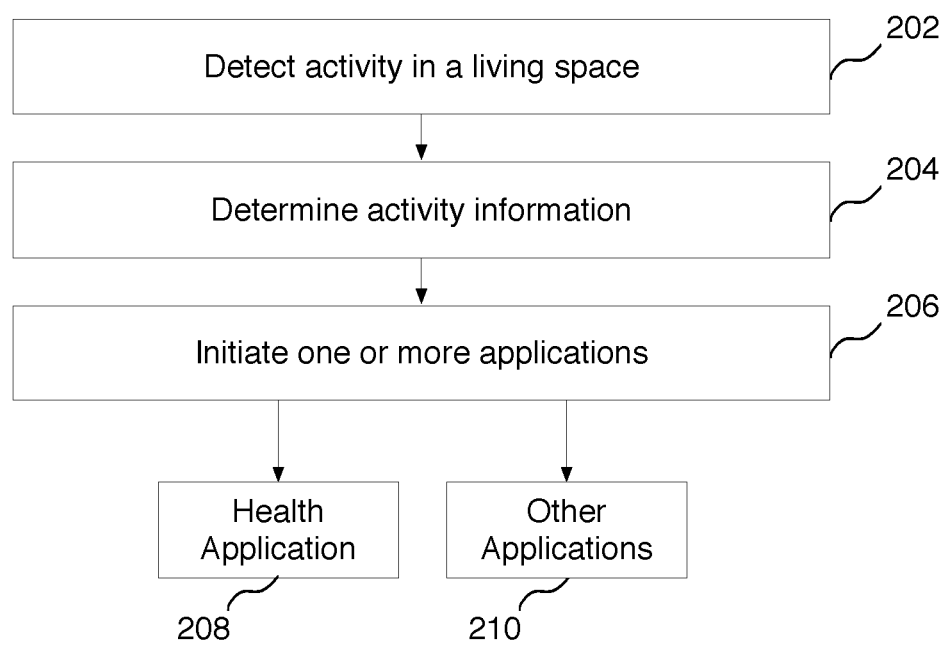
FIG. 2 illustrates an example flow diagram for operation of one or more applications associated with one or more sensor devices, according to some implementations.

FIG. 2 illustrates an example flow diagram for operation of one or more applications associated with one or more sensor devices, according to some implementations. For ease of illustration, example implementation steps described herein are described in the context of a single sensor device, such as sensor device 120. These implementations and others may apply to any sensor device, such as any one or more sensor devices of FIG. 1.

Referring to both FIGS. 1 and 2, a method is initiated at block 202, where sensor device 120 detects activity in a living space. Activity may include, for example, a person entering a room, a person making a motion from a still position, etc.

At block 204, sensor device 120 determines activity information associated with the activity. In various implementations, the sensor may detect particular activities in human behavior that occur in the living space (e.g., walking, running, falling, etc.). For example, a person may stand up from a sitting position. The person may walk across a room. The person may enter a room from another room. In some implementations, sensor device 120 may determine which other room the person came from by obtaining activity information from the last sensor device that detected activity information of the person. In various implementations, sensor device 120 aggregates activity information from itself and other sensor devices if available. Sensor device 120 also automatically sends aggregated activity information to other sensor devices directly and/or via a wireless router.

In some implementations, sensor device 120 determines if it is in a vacation mode. As described in more detail herein, in various implementations, applications running on sensor device 120 may perform different steps depending on whether sensor device 120 is in vacation mode or not. The various types of activity information may depend on the particular implementation and are described in more detail herein.

In some implementations, sensor device 120 may detect activity when the sensor device is in vacation mode (e.g., the user is on vacation). In some implementations, a sensor device may detect activity when the device is in an inactive mode (e.g., when the user is supposed to be inactive). In some implementations, a sensor device might not detect activity when the user is supposed to be active within and during certain periods. As such, the sensor device may issue an alert. In some implementations, the sensor device may pair up with other devices to detect other specifics (e.g., a possible fall that the user has taken).

At block 206, sensor device 120 initiates one or more applications to perform various functions. In various implementations, sensor device 120 provides a unified single device platform for multiple applications or services, which are described in more detail herein. In various implementations, the particular applications that sensor device 120 initiations may depend on the activity information.

At block 208, sensor device 120 initiates a health application. In some implementations, sensor device 120 may initiate the health application based on predetermined behavioral patterns that sensor device 120 detects. For example, in some implementations, sensor device 120 may initiate the health application when sensor device 120 detects that the person is not taking enough breaks during the user's routine tasks. In some implementations, sensor device 120 may initiate the health application when sensor device 120 detects that the person is not moving after a predetermined period of time (e.g., after a fall, etc.). In some implementations, sensor device 120 may initiate a health application when sensor device 120 detects that the user is not moving at predetermined intervals. As described in more detail herein, when the health application detects adverse health events, the health application performs various health-related functions.

In some implementations, at block 210, sensor device 120 may initiate other types of applications. The particular types of applications may vary depending on the particular implementation.

Figure 3:
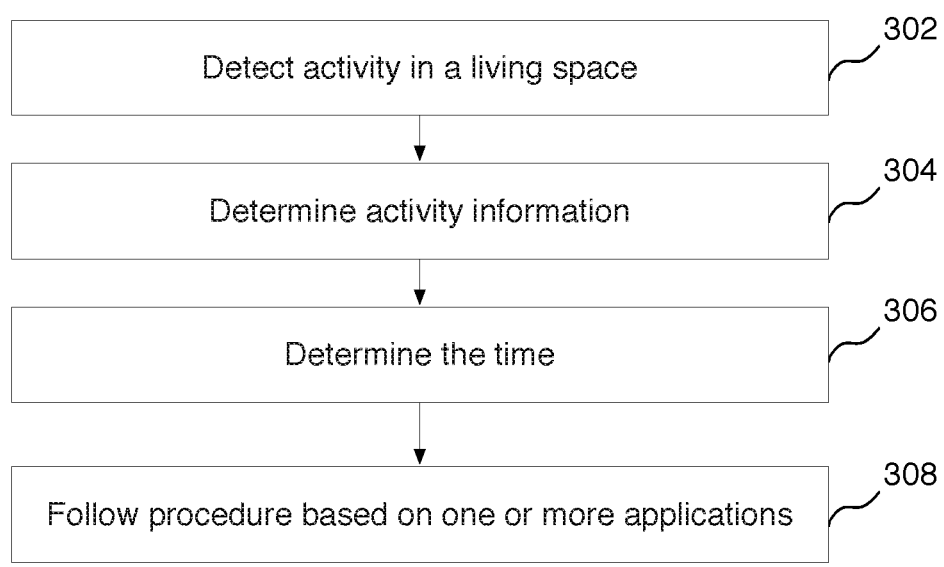
FIG. 3 illustrates an example flow diagram for operation of a sensor device, according to some implementations.

FIG. 3 illustrates an example flow diagram for operation of a sensor device, according to some implementations. For ease of illustration, example implementations are described herein in the context of a single sensor device, such as sensor device 120. These implementations and others may apply to any sensor device, such as any one or more sensor devices of FIG. 1.

Referring to both FIGS. 1 and 3, a method is initiated at block 302, where sensor device 120 detects activity in a living space. As indicated herein, activity may include, for example, a person entering a room, a person making a motion from a still position, etc.

At block 304, sensor device 120 determines activity information associated with the activity. In some implementations, the activity information is associated with the activity of the person detected. For example, a person may stand up from a sitting position. The person may walk across a room. The person may enter a room from another room.

As described in more detail herein, in various implementations, activity and activity information generated at block 302 and block 304 may trigger the one or more applications to perform various functionalities.

In various implementations, the sensor devices of residential sensor device platform 100 socialize with each other by sharing information with each other and learning from each other. For example, in various implementations, sensor device 120 exchanges activity information with other sensor devices in the network of sensor devices via a master sensor device and/or wireless router. For example, sensor device 120 may send activity information to one or more other sensor devices. Sensor device 120 may also receive activity information from one or more other sensor devices. As indicated above, the activity information may be exchanged among sensor devices via a master sensor device and/or wireless router. In some implementations, sensor device 120 may function as the master device.

In various implementations, the sensor devices share information and socialize based on one or more attributes. Different sensor devices may share intelligence with other sensor devices in order to optimize protocols of the applications. In some implementations, one attribute may be a particular group to which a given sensor device belongs. For example, one or more sensor devices may belong to a particular ambient sensor group. One or more sensor devices may belong to a particular physical location (e.g., a particular room, a particular portion of a house, etc.). In some implementations, a group of sensor devices need not be in the same house.

In various implementations, one sensor device may be a part of multiple groups, where each group may serve one or more different purposes. For example, a group of sensor devices may be implemented in connection a health application and/or other application.

At block 306, sensor device 120 determines the time. For example, sensor device 120 may determine that the time is 10:00 am, 2:00 pm, or 7:00 pm, etc. In some implementations, sensor device 120 may also determine a date associated with the time.

At block 308, sensor device 120 follows a procedure based on one or more applications. In various implementations, one or more devices take action not based on the activity information, but based on one or more applications. For example, as described in more detail herein, sensor device 120 may follow a schedule based on the time and based on any one or more applications such as a health application, etc. In some implementations, a particular procedure may end or change based on the time and/or date, or based on other applications, depending on the particular implementation. For example, sensor device 120 may adjust for daylight savings time, end of a school year, guests staying in the house, etc. Furthermore, in some implementations, a particular procedure may make changes to the outdoor surrounding landscape, such as path lights, outdoor security cameras, automatic driveway gate, etc., depending on the particular implementation.

Figure 4:
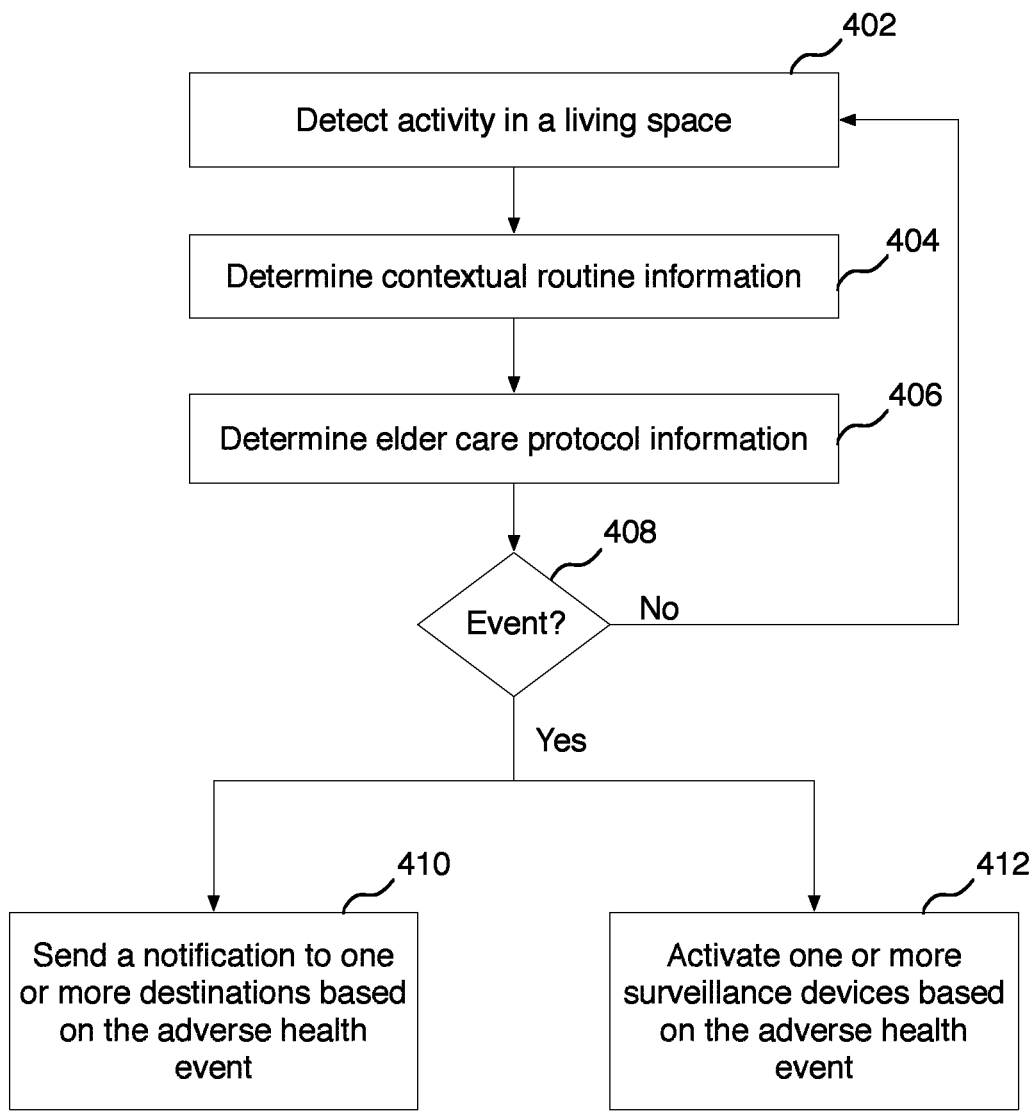
FIG. 4 illustrates an example flow diagram for operation of a health application that detects adverse health events, according to some implementations.

FIG. 4 illustrates an example flow diagram for operation of a health application that detects adverse health events, according to some implementations. In various implementations, the health application functions based on learning routine information and behavioral patterns of a person or group of people. In various implementations, the routine pattern may include one or more signatures, where each signature characterizes routine user or group behavior within the living space. In some implementations, the user behavior may include behavior of a user or group of users in one or more particular locations (e.g., rooms or areas) in the living space. As such, the health application enables monitoring the user in a living space based on patterns of behavior in separate rooms or common areas of the living space. Routine information, pattern and routine signatures are described in more detail herein.

Referring to both FIGS. 1 and 4, a method is initiated at block 402, where sensor device 120 detects an activity in a living space. In some implementations, the activity includes one or more motions or movements of a person in the living space. As indicated herein, sensor device 120 detects these activities without the use of a camera. In some implementations, sensor device 120 may detect an activity, characterize the type of activity, and detect particular aspects of the activity such as an initial motion of the activity. For example, sensor device 120 may detect a person entering a room and walking in the room.

In some implementations, sensor device 120 may detect particular aspects of the activity such as a resumption of an activity after some inactivity (e.g. making a motion after being in a still position, etc.). For example, such a resumption of an activity may be the person sitting up from a lying position after lying down for some time, standing up from a sitting position after sitting for some time, etc. In some implementations, sensor device 120 may determine the user to be in a still position, where sensor device 120 detects activity, followed by inactivity such as detecting no movement for a predetermined amount of time (e.g., 30 minutes, 1 hour, 6 hours, etc.), then followed by activity. The activity subsequent to the inactivity may be the resumption of the activity.

In some implementations, sensor device 120 may detect particular aspects of the activity such as an end to an activity, beginning of new activity, etc. For example, sensor device 120 may detect a person walking, sitting, or lying down, etc. followed by inactivity for a predetermined amount of time (e.g., 30 minutes, 1 hour, 6 hours, etc.), followed by new activity. For example, sensor device 120 may detect a person sitting at a desk, getting up and walking to a bed, lying down to sleep for 7 hours, then getting up to leave the room.

In another example implementation, the person may be walking and then trip and fall, and not get up. In this example, sensor device 120 may detect the person walking, then detect a downward motion to the ground, then detect little to no activity. In various implementations, sensor device 120 may distinguish between a person falling and the person lying down. For example, sensor device 120 may detect the downward motion to be quick as in a fall, and may detect the person to be on ground level for a duration of time (e.g., 10 minutes, 30 minutes, etc.). Sensor device 120 may also distinguish between the person being at ground level versus a higher level (e.g., on a bed or sofa).

At block 404, sensor device 120 determines contextual routine information. In some implementations, the contextual routine information is associated with the detected activity. In some implementations, the contextual routine information is associated with the activity of the person detected. For example, in some implementations, the contextual routine information may include the type of activity such as walking, or standing up from a sitting position. In some implementations, the contextual information may include times of the day when a particular activity occurs. For example, sensor device 120 may detect that a person gets up from a lying position between 7:00 a.m. and 7:30 a.m. most mornings, or on particular mornings (e.g., Tuesdays and Thursdays, etc.).

In some implementations, contextual routine information may include information about activity with respect to a particular room or area within the living space. For example, contextual routine information may include information on whether a person walked within, into, or out of a particular location within the living space (e.g., bedroom, study, kitchen, and other rooms). For example, the contextual routine information may include information on whether a person is walking across a room, entering a particular room from another room (e.g., from a hallway into a bedroom). The contextual routine information may also include information on general areas in the living space (e.g., particular floors). For example, the contextual routine information may include whether a person went from an upper floor to a lower floor. In various implementations, contextual information may include how often and/or when a person goes from one room of the living space to another room, or from one floor to another, or when the person enters the living space or leaves the living space.

In various implementations, contextual information may include a combination of different variables. For example, contextual information may include a combination of type of activity, location patterns, time patterns, frequency patterns, etc. For example, contextual information my include a person walking up everyday at 7:00 a.m., walking to the bathroom at 7:05 a.m., walking to the kitchen at 7:30 a.m., preparing and eating breakfast between 7:30 a.m. and 8:00 a.m., then walking to living room at 8:00 a.m., to watch television, etc.

In some implementations, sensor device 120 may distinguish between a person and a pet based on one or more predetermined criteria such as one or more size, mass, height, and movement or behavior of the person or pet. In some implementations, contextual routine information may include whether the detected activity is the activity of a person or a pet.

In various implementations, sensor device 120 determines the type of the detected activity or category of activity the detected activity based on the detected motion or set of motions. For example, sensor device 120 may determine that a person is sitting, standing, walking, running, jumping, moving his/her hands, etc. In some implementations, sensor device 120 may detect where a person is positioned in a room, the posture of the person (e.g., standing, sitting, lying down, etc.), the speed of the person (e.g., whether the person is walking, running, etc.), the amount of movement (e.g., sitting and writing, walking across a room, etc.), etc. In various implementations, sensor device 120 may determine behavior patterns or a behavior signature of an individual.

As indicated above, in various implementations, activity and activity information generated at block 402 and block 404 may trigger the health application to perform various functionalities. For example, as described in more detail herein, in various implementations, the health application associated with sensor device 120 performs the steps of block 406 through block 412 based on the activity and activity information generated at block 402 and block 404.

As indicated herein, in various implementations, sensor device 120 exchanges activity information with other sensor devices in the network of sensor devices via a master sensor device and/or wireless router. In some implementations, sensor device 120 may function as the master device.

At block 406, sensor device 120 determines user care protocol information. In some implementations, the user protocol information includes routine information. For example, seniors often have routine days. As such, sensor device 120 may learn and predict movement patterns (e.g., using pattern recognition techniques, etc.) in order to customize user care protocol for the individual. In some implementations, the routine pattern-based information may include one or more types or categories of activity. For example, types of activity may include a person changing from a lying position to a sitting position, changing from a sitting position to a standing position, walking, and other movements. In some implementations, the routine information may include one or more locations of activity. For example, locations of activity may include bedrooms, bathrooms, hallways, living rooms, family rooms, and other rooms of a living space. In some implementations, the routine information may include one or more times of particular activity. For example, times of an activity may include particular days, times of particular days, time durations, etc.

In various implementations, routine information includes a combination of activities in different locations, as well as times and time periods. For example, during a daily routine, a person wakes up at particular time (e.g., 7:00 a.m., etc.) or time period (e.g., between 7:00 a.m. and 7:30 a.m., etc.). The person may get out of bed and go to into bathroom for a time period (e.g., 10 minutes, 20 minutes, etc.). The person may then go to the kitchen for breakfast for a time period (e.g., 20 minutes, 30 minutes, etc.). The person may go to the living room to read or watch television for a time period (e.g., an hour, etc.).

In various implementations, the system may have trigger points in each location, wherein each sensor device detects activity and establishes time references for each activity event detected. For example, a sensor device in a bedroom would be triggered when it detects a person sitting up. The sensor device may log the time that it first detects activity (e.g., 7:00 a.m., etc.). If the person walks from the bedroom to the bathroom, the sensor device in the bedroom may log the time it stops detecting activity (e.g., 7:10 a.m., etc.), and a sensor device in the bathroom would log the time it first detects activity (e.g., 7:10 a.m., etc.), and so on. In various implementations, the system determines patterns of activity and learns routine behavior. The system includes such learned routine behavior to the routine pattern-based information.

At block 408, sensor device 120 determines if an adverse health event has occurred. In some implementations, adverse health events may include, for example, a person breaking his or her routine. For example, sensor device 120 may detect activity and compare the current/detected activity to routine information of the user care protocol information. If there is a mismatch, the sensor may log the mismatch as an anomaly and generate a flag. In some implementations, there may be different flags representing different degrees of adversity. For example, if the routine information indicates 20 minutes as an average time spent in the bathroom but the sensor device in the bathroom logs a longer time than usual where the amount of time is above a first threshold (e.g., 30 minutes longer than the expected/average time, etc.), the sensor device may generate a yellow flag. A yellow flag may or may not be considered an adverse health event, depending on the particular implementation. If the routine information indicates 20 minutes as an average time spent in the bathroom but the sensor device in the bathroom logs a time that is above a second threshold (e.g., 45 minutes longer than the expected/average time, etc.), the sensor device may generate a red flag. The particular length of time beyond the usual time that is considered a yellow flag or a red flag, etc. may vary and will depend on the particular implementation. In some implementations, the sensor device may share the flag with the master sensor device and/or other sensor devices.

In some implementations, adverse health events may include, for example, a sudden fall, a lack of movement for longer than certain time period, etc. For example, activity collaboration among multiple sensor devices may help with adverse conditions such as a sudden fall, lack of moment for longer than a predetermined period of time, continuous moving longer than a predetermined period of time (e.g., when the person is prone to falling or a person should be taking breaks, etc.). In some implementations, sensor device 120 may be configured to receive information from a wearable device on the person or other mobile/handheld device with the person. Sensor device 120 may add such information, including heuristic information to the routine information. In various implementations, the heuristic information may be collected by a wearable device and associated sensors that collect information such as blood pressure, heart rate, sleep patterns, etc.

In some implementations, sensor device 120 learns a routine or behavior signature of a person, where the routine or signature may be defined in part by a virtual boundary in which the person typically moves. In various implementations, sensor device 120 may track an individual to determine if the person is following a typical routine. This may give a caregiver (e.g., in an assisted living scenario, etc.) or a remote family member peace of mind that the individual (e.g., senior) is okay.

In some implementations, an adverse health event may include a person moving beyond a virtual boundary. Sensor device 120 may then track the person and determine if the person breaks the routine (e.g., moves beyond a virtual boundary). For example, if the individual typically stays within a particular virtual boundary (e.g., floor, room, etc.) during particular times but all of a sudden breaks the routine. Sensor device 120 may phone a particular person (e.g., the individual being tracked, caregiver, etc.) to make sure everything is okay (e.g., the individual is not lost, etc.).

In some implementations, if no adverse health event has occurred, sensor device 120 continues to detect activities in the living space.

In some implementations, if the person deviates from a routine yet continues with activity, sensor device 120 may deem the deviation to not be an adverse health event. In various implementations, sensor device 120 tracks such changes in a routine, where a change may establish a new routine pattern.

At block 410, if sensor device 120 determines that an adverse health event has occurred, sensor device 120 may send a notification to one or more destinations based on the adverse health event. For example, if sensor device 120 detects an adverse health event such as a sudden fall, lack of movement, etc., sensor device 120 may send a notification to a predetermined destination such as a call service, caretaker, family, etc. If the call service is an automated call service, the call service may call the person associated with the adverse health event. If that person in question answers the call, there might not be a problem (e.g., the person was simply asleep, etc.). If there is a problem, appropriate action may be taken. For example, if the person is not moving (e.g., unconscious), sensor device 120 may call an appropriate destination (e.g., call service, caretaker, family, etc.) with a notification that the call has not been answered. In another example, if the person is conscious, the person can ask for help. As such, sensor device 120 may call an appropriate destination (e.g., call service, caretaker, family, etc.) with a notification that help is needed. In either case, sensor device 120 may facilitate in a determination that the person is conscious or not moving/unconscious, needs help, etc.). In various implementations, sensor device 120 notifies how long the person has not moved, or the last time when and where person was determined to be mobile.

At block 412, if sensor device 120 determines that an adverse health event has occurred, sensor device 120 may also activate one or more surveillance devices based on the adverse health event. In various implementations, the surveillance device may include video and audio devices. In various implementations, in order to minimize disruption of privacy on a day-to-day basis, the video surveillance may kick in only when adverse events are detected. In some implementations, a sensor device may support a safety and security mode, which triggers a state machine to generate appropriate event notifications and alerts. Such notifications and alerts may be sent to predetermined persons such as family members, caretakers, emergency services, etc. In some implementations, notifications may be send to the person in question to confirm whether or not the person needs help or not.

In various implementations, sensor device 120 may identify different people using any suitable identification techniques, and may monitor activity in order to detect adverse health events of multiple people. Such implementations may be applied in group living situations such as nursing homes.

Although the steps, operations, or computations may be presented in a specific order, as shown in the example of FIG. 4, the order may be changed in particular implementations. The ordering of blocks 402 through 412 is merely one example ordering. Other orderings of the blocks/steps are possible, depending on the particular implementation. For example, blocks 410 and block 412 may occur simultaneously, or in any order. While some implementations are described herein in the context of user care, these implementations and other may also apply to people with other health concerns. For example, implementations may also apply to people with injuries, long-term disabilities, etc.

Figure 5:
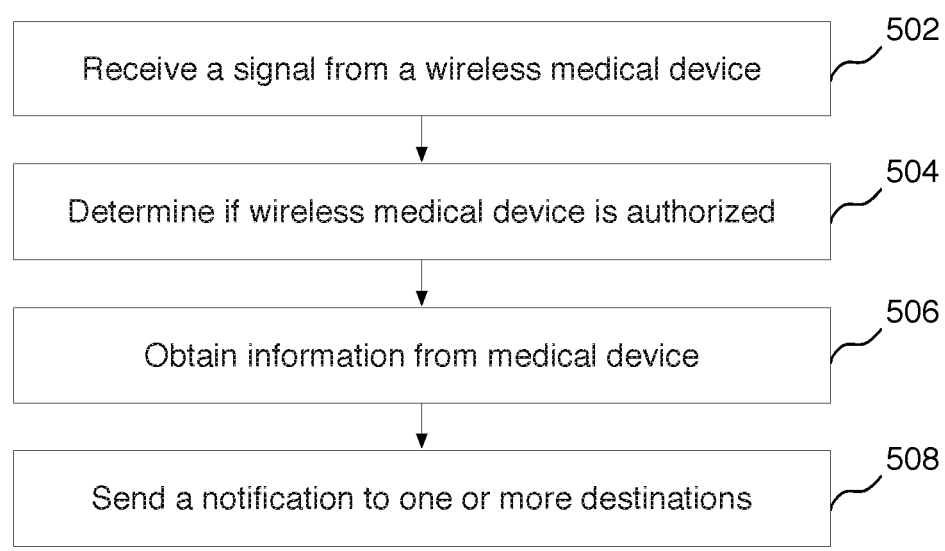
FIG. 5 illustrates an example flow diagram for operation of a health application that detects medical devices, according to some implementations.

FIG. 5 illustrates an example flow diagram for operation of a health application that detects medical devices, according to some implementations. In various implementations, residential sensor device platform 100 provides a network for medical devices. Referring to both FIGS. 1 and 5, a method is initiated at block 502, where sensor device 120 receives a signal from a wireless medical device. Such a wireless medical device may include any device (e.g., a blue tooth device) that collects medical information of an individual (e.g., heart rate monitor, blood pressure monitor, etc.).

At block 504, sensor device 120 determines if the wireless medical device is authorized. In particular, sensor device 120 checks if the wireless medical device is authorized to access the network residential sensor device platform 100.

At block 506, sensor device 120 obtains information from the medical device. In various implementations, sensor device 120 may compare information from the medical device to information associated with a detection of an adverse health event. For example, if sensor device 120 detects a fall from a person and the information from the medical device indicates an abnormal heart rate, or abnormally high blood pressure, etc., sensor device 120 may deem the adverse health event as a high-level emergency for notification purposes.

As indicated herein, in various implementations, sensor device 120 exchanges activity information with other sensor devices in the network of sensor devices via a master sensor device and/or wireless router.

At block 508, sensor device 120 sends a notification to one or more destinations. Such destinations may include, for example, a participating medical service, family members, caretakers, etc.

Figure 6:
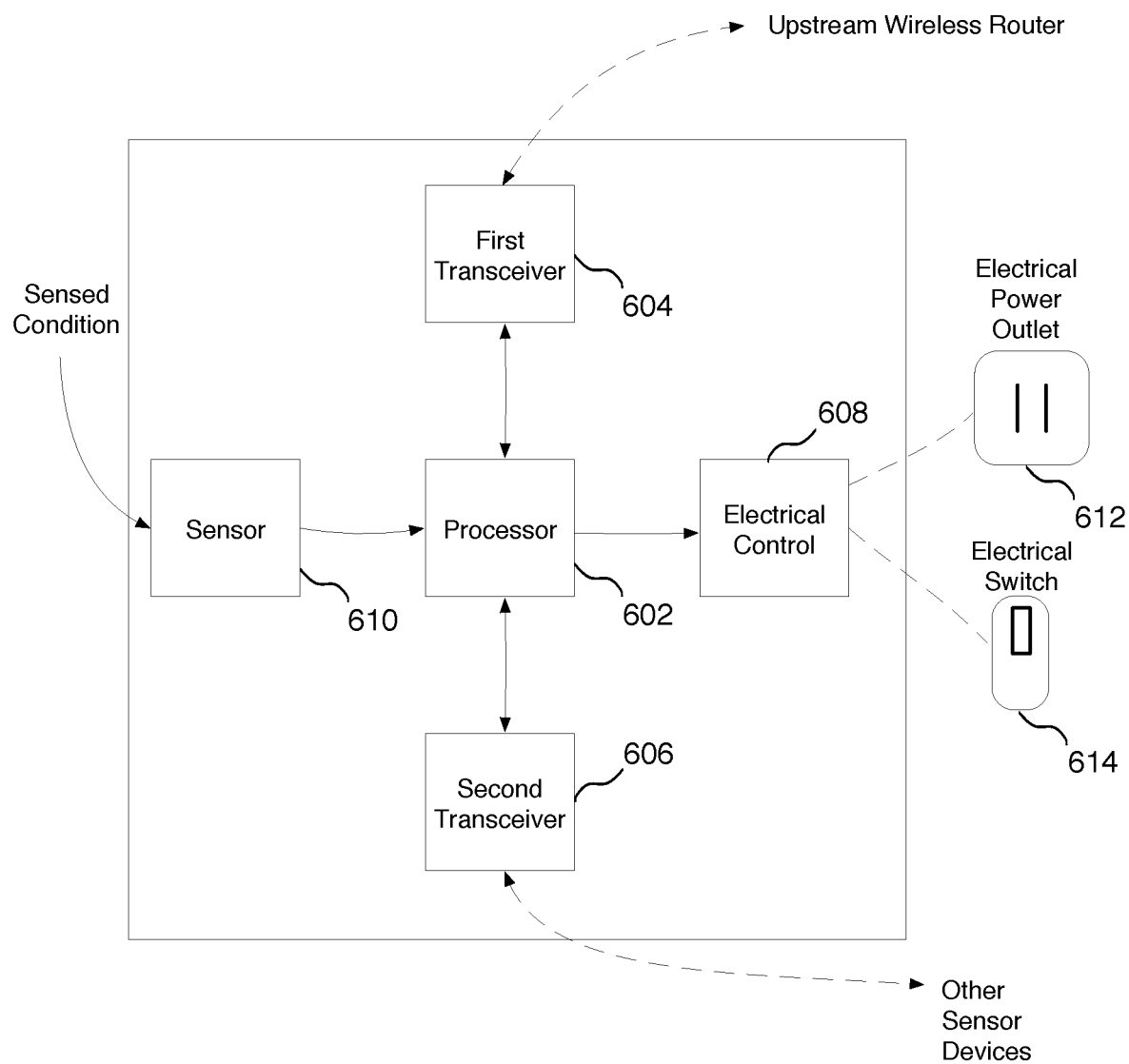
FIG. 6 illustrates a block diagram of an example sensor device, according to some implementations.

FIG. 6 illustrates a block diagram of an example sensor device 600, according to some implementations. In various implementations, sensor device 600 is a residential sensor device that is implemented in residential environments. Sensor device 600 may also be referred to as residential sensor device 600. Sensor device 600 is not limited to residential environments and may be implemented in non-residential environments, including both indoor and outdoor environments. In various implementations, sensor device 600 may be used to implement sensor device 120 of FIG. 1 and/or any of the other sensor devices of FIG. 1.

As shown, for this particular implementation, residential sensor device 600 may be used to implement one or more of multiple sensor devices in a network, such as a wireless network, a wireless mesh network, etc.

In various implementations, when a first sensor device is configured, the rest of the sensor devices are self-configuring in that they automatically configure themselves based on the configuration of the first sensor device.

As described in more detail below, sensor device 600 has a multi-virtual network interface (e.g., a dual interface, etc.). In some implementations, one interface may be used for an uplink mode (e.g., Internet mode) to link to a wireless router, etc. In some implementations, a second interface may be used for a mesh mode to link to mesh nodes, etc. For example, in various implementations, sensor device 600 includes a controller or processor 602. In various implementations, sensor device 600 also includes a first transceiver 604 operative to support uplink communication with a wireless router. In various implementations, the wireless router is an upstream wireless router. Sensor device 600 also includes a second transceiver 606 operative to support mesh link communication with other sensor devices. Sensor device 600 also includes an electrical control 608 that controls one or more electrical power outlets 612 and/or one or more electrical switches 614. In various implementations, sensor device 600 includes a sensor 610 operative to sense a condition of a living space. For ease in illustration, one sensor 610 is shown. However, in various implementations, sensor 610 may represent multiple sensors. For example, sensor device 600 may include a light sensor, a motion sensor, a thermometer, a barometer, a moisture sensor, etc. In some implementations, processor 602 is operative to communicate with the wireless router through the first transceiver, communicate with other sensor devices through the second transceiver, and receive the sensed condition of the living space. As indicated herein, a living space may include indoor and outdoor spaces.

In various implementations, if sensor device 600 functions as a master sensor device, sensor device 600 is configured with a dual link, having both an uplink to the upstream wireless mesh router and a mesh link to the other sensor devices of the mesh network. In various implementations, the other sensor devices of the mesh network (e.g., slave sensor devices) are configured only with the mesh link.

If any new sensor device is added to the mesh network, the new sensor device may self configure similar to the other non-master sensor devices of the wireless mesh network. As such, implementations provide automatic-range extender functionality.

In various implementations, one or more processors of the sensor devices are operative to select a master sensor device from the sensor devices, where the master sensor device maintains communication with the wireless router, and where other sensor devices are designated as slave sensor devices and form a wireless mesh network with the other sensor devices through wireless communication with the other sensor devices through the second transceivers of the slave sensor devices.

For ease of illustration, FIG. 6 shows one block for each of processor 602, first transceiver 604, second transceiver 606, electrical control 608, sensor 610, electrical power outlet 612, and electrical switch 614. Each of blocks 602, 604, 606, 608, 610, 612, and 614 may represent multiple first transceivers, second transceivers, electrical controls, sensor devices, processors, electrical power outlets, and electrical switches.

In other implementations, sensor device 600 may not have all of the components shown and/or may have other elements including other types of elements instead of, or in addition to, those shown herein. For example, sensor device 600 may be implemented by computing device 600 of FIG. 6, which is described in more detail below. In various implementations, sensor device 600 may include a combination of some or all of the elements shown in FIGS. 6 and 7, and may include other types of elements instead of, or in addition to, those shown in FIGS. 6 and 7.

In some example implementations, sensor device 600 function as a master sensor device. However, other sensor devices may also function as master sensor devices. Also, in some scenarios, sensor device 600 may function as a slave sensor device relative to another master sensor device. In some implementations, the residential sensor device platform may include multiple different master sensor devices at a given time. For example, there may be multiple master sensor devices for different applications.

In various implementations, sensor device 600 and the sensor devices of the residential sensor device platform may be referred to as a hybrid mesh, because the sensor devices may have functions and capabilities of a mesh network, and the sensor devices may also have one or more master sensor devices simultaneously or serially. In various implementations, the sensor devices of the residential sensor device platform may include point-to-point plus repeater functionality.

Link or interface differentiation between the master sensor device and the mesh versus the master device and the wireless router may be achieved according to the following implementations. For example, in various implementations, the different links are dual interfaces in that one interface is among sensor devices of a mesh network, and a different, separate interface is between the master sensor device and a wireless router. In various implementations, the different links may be implemented as a dual interface or dual channel using a common radio, or multiple links or channels of a common radio.

In some implementations, one or more processors of respective sensor devices are operative to select the master sensor device from the sensor devices, where the master sensor device maintains communication with the upstream wireless router. In various implementations, as indicated above, the non-master sensor devices of the wireless sensor devices are designated as slave sensor devices. In various implementations, the wireless devices form a wireless mesh network through wireless communication through their respective second transceivers.

In some implementations, each sensor device checks or determines its proximity to the access point or upstream wireless router. In some implementations, the proximity is estimated based on the signal strength or signal quality of signals received by the device from the upstream wireless router. The sensor device having the highest received signal strength of the highest signal quality wins. That sensor device with the highest signal quality is selected as the master sensor device, and the other sensor devices are designated as the slave sensor devices. In some implementations, the sensor device closest to a home access point becomes the master sensor device with dual interface (e.g., active, active). The other sensors devices become slaves and participate in client mode (e.g., active, passive).

In some implementations, mobile applications may directly connect to any sensor device. In some implementations, each sensor device may configure itself through network sharing (e.g., physical unclonable function (PUF) and/or advanced encryption standard (AES) 128-bit encryption, etc.). In various implementations, third-party devices may participate in the quasi-mesh network if authenticated. In some implementations, slave devices send data to a master device every predetermined time period (e.g., every 10 minutes, 15 minutes, etc.), which is configurable. In some implementations, a master sensor device packages data from all devices in a predetermined time period (e.g., 10-minute window, 15-minute window, etc.), and pushes the data to the cloud server, which in turn may push the data to one or more applications at predetermined time periods (e.g., every 10 minutes, 15 minutes, etc.). In some implementations, one or more applications may automatically synchronize data with the cloud servers at predetermined time interviews (e.g., hourly basis, etc.) if data is not pushed from the cloud server. Real-time info may be available on refresh or based on event policies. Applications directly interact with local devices.

In some implementations, if the selected master sensor device fails, the one or more processors of the sensor devices reselect the master sensor device from the other sensor devices. That is, the wireless mesh network formed by the sensor devices is operative to configure themselves to self-configure or self-heal if one or more of the sensor devices fail. For example, in some implementations, the self-healing may include sensor devices of the wireless mesh network selecting a new master sensor device if the present master sensor device fails. In various implementations, all sensor devices have dual link, uplink, and mesh link functionality, and any of the currently non-master sensor devices may be eligible to become a new master device. In some implementations, a sensor device that was previously a master sensor device and that was later replaced (e.g., due to failure or other reason, etc.) may again be selected as the new master sensor device based on one or more predetermined criteria (e.g., getting fixed, etc.).

In some implementations, the self-healing includes selecting new routing paths from the master device to downstream sensor devices if one or more of the sensor devices of the residential sensor device platform fail. In various implementations, the meshing functionality of the sensor devices provides auto-range extender functionality for other devices to participate as a network service provider.

In some implementations, the signal strength or quality determination and rankings are further used to identify the second best and/or third best signal strengths, and the sensor devices are ranked accordingly. These sensor devices can be used as backup master sensor devices if the current master sensor device fails for some reason. In various implementations, the ranking is based on signal strengths and may be used to determine a priority for backup. For example, in some implementations, the highest-ranking sensor device may be selected as the master sensor device. If the highest-ranking sensor device is not available, the next highest ranking sensor device may be selected as the master sensor device. If there is a tie, the master sensor device may be selected randomly or based on another aspect (e.g., proximity, etc.).

In some implementations, one or more of the sensor devices are associated with one or more electrical power outlets and/or and one or more electrical light switches.

In various implementations, each of the one or more processors of the one or more of respective sensor devices is operative to control operation of the electrical control (which may in turn control one or more electrical power outlets and/or one or more electrical light switches) based on at least the sensed condition of the living space. In some implementations, the sensed condition may be based on various types of sensors (e.g., a light sensor, a motion sensor, a thermometer, a barometer, etc.) indicating various aspects of the living space.

In various implementations, each of the one or more processors of the one or more respective sensor devices is operative to control operation an electrical control (which may in turn control one or more electrical power outlets and/or one or more electrical light switches) based on at least the sensed occupancy of the living space. In some implementations, the sensed occupancy may be based on a motion sensor indicating that the living space is being occupied by a person. In some implementations, the sensed occupancy may include a sensed occupancy of a space proximate to the one or more sense devices. In some implementations, the sensed condition includes a sensed occupancy.

In various implementations, the sensed conditions and/or the sensed occupancy may be shared over the mesh network to control one or more of the power outlets or one or more of the electrical switches. The control may include turning the power of the one or more power outlets on or off, or switching the one or more electrical switches on or off.

In some implementations, one or more processors of sensor device 600, as well as those of other sensor devices, are operative to at least partially control operation of another device. In some implementations, the other devices may include one or more of a water heater, watering systems, garage door, etc. The sense information of sensor device 600 may be used to determine a condition of another device, and advantageously control the other device. For example, sensed occupancy (or the lack of) can be used to determine whether a water heater should be active or not. Generally, the other devices need not necessarily have a sensor. Such devices may rely on the sensing information of one of the sensor devices.

In some implementations, one or more processors of sensor device 600, as well as those of other sensor devices, are operative to at least partially control operation of the sensor devices themselves or another device based on timing. For example, situations can include control of certain lights of a residence that need to be turned on, for example, at 8:00 PM, but ideally also take in account occupancy within the residence. For example, front lights of a residence and back lights of the residence may be controlled differently depending upon occupancy within the residence.

In some implementations, one or more processors of sensor device 600, as well as those of other sensor devices, are operative to at least partially control operation of themselves or another device based on environmental parameters.

Figure 7:
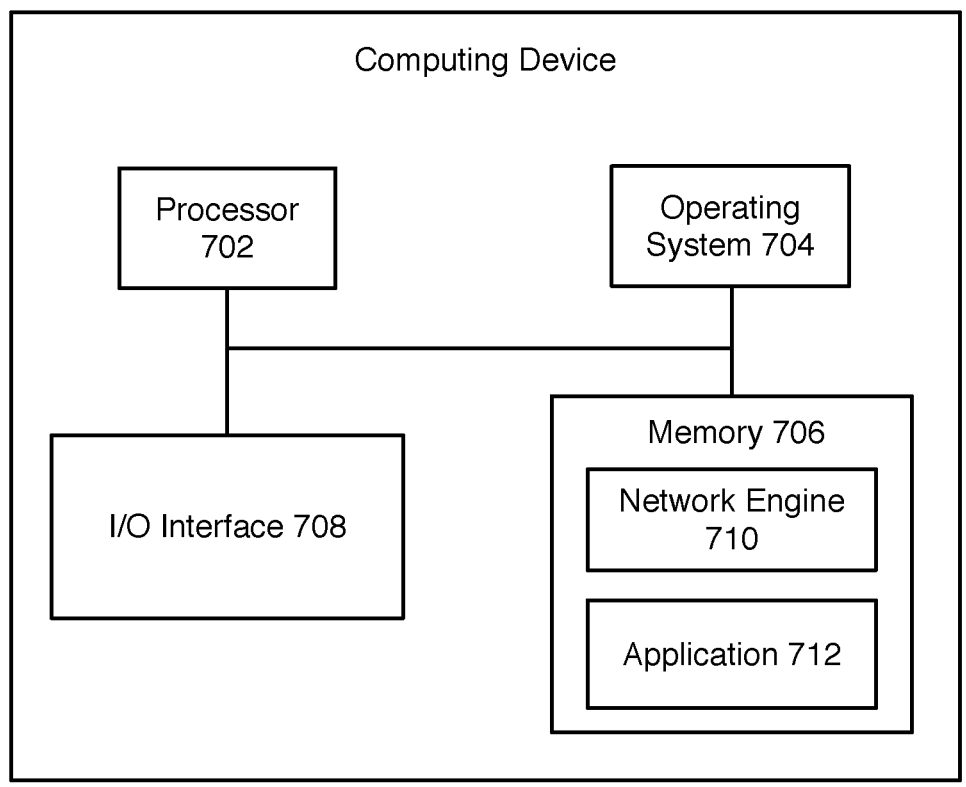
FIG. 7 illustrates a block diagram of an example computing device, according to some implementations.

FIG. 7 illustrates a block diagram of an example computing device 700, according to some implementations. For example, computing device 700 may be used to implement a sensor device such as sensor device 600 of FIG. 6, sensor device 120 of or other sensor devices of FIG. 1, as well as to perform the method implementations described herein. In some implementations, computing device 700 includes a processor 702, an operating system 704, a memory 706, and an input/output (I/O) interface 708. Computing device 700 also includes a network engine 710 and an application 712, which may be stored in memory 706 or on any other suitable storage location or computer-readable medium. Application 712 provides instructions that enable processor 702 to perform the functions described herein and other functions. For ease of illustration, one application 712 is shown. Application 712 may represent multiple applications. For example, multiple applications such as a health application and other applications, etc. may be stored in memory 706 and executed by processor 702.

For ease of illustration, FIG. 7 shows one block for each of processor 702, operating system 704, memory 706, I/O interface 708, network engine 710, and application 712. These blocks 702, 704, 706, 708, 710, and 712 may represent multiple processors, operating systems, memories, I/O interfaces, network engines, and applications. In other implementations, computing device 700 may not have all of the components shown and/or may have other elements including other types of elements instead of, or in addition to, those shown herein.

Although the description has been described with respect to particular implementations thereof, these particular implementations are merely illustrative, and not restrictive. Concepts illustrated in the examples may be applied to other examples and implementations. For example, some implementations are described herein in the context of a wireless mesh network system. However, the implementations described herein may apply in contexts other than a wireless mesh network.

Note that the functional blocks, methods, devices, and systems described in the present disclosure may be integrated or divided into different combinations of systems, devices, and functional blocks as would be known to those skilled in the art.

In some implementations, a non-transitory computer-readable storage medium carries program instructions thereon, where the instructions when executed by one or more processors cause the one or more processors to perform operations including one or more of the steps described herein.

In some implementations, a method includes one or more means for performing one or more of the steps described herein.

In some implementations, a system includes one or more processors, and logic encoded in one or more tangible media for execution by the one or more processors. When executed, the logic is operable to perform operations including one or more of the steps described herein.

In some implementations, a system includes a storage device, and one or more processors accessing the storage device and operable to perform operations including one or more of the steps described herein.

The foregoing description includes references to the accompanying drawings, which form a part of the detailed description. The drawings show specific implementations by way of illustration. In the various descriptions, these embodiments are also referred to herein as "implementations" and/or "examples." Such examples may include elements in addition to those shown or described. Such examples may optionally omit some elements mentioned. Moreover, such examples may include any combination or permutation of those elements shown or described (or one or more aspects thereof).

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or on multiple processors. Although the steps, operations, or computations may be presented in a specific order, the order may be changed in particular embodiments. In some particular embodiments, multiple steps shown as sequential in this specification may be performed at the same time.

Particular embodiments may be implemented in a computer-readable storage medium (also referred to as a machine-readable storage medium) for use by or in connection with an instruction execution system, apparatus, system, or device. Particular embodiments may be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), solid state memory (e.g., flash memory, etc.), or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, etc.

Particular embodiments may be implemented by using a programmed general purpose digital computer, by using application specific integrated circuits, programmable logic devices, field programmable gate arrays, optical, chemical, biological, quantum or nanoengineered systems, components and mechanisms. In general, the functions of particular embodiments may be achieved by any means known in the art. Distributed, networked systems, components, and/or circuits may be used. Communication or transfer of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that is stored in a machine-readable medium to permit a computer to perform any of the methods described above.

As used in the description herein and throughout the claims that follow, "a," "an," and "the" include plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, they are intended to cover various modifications and similar arrangements as would be apparent to those skilled in the art. Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A residential electrical switch sensor device platform comprising:
    a plurality of sensor devices, wherein each sensor device of the plurality of sensor devices communicates with a wireless router and with other sensor devices of the plurality of sensor devices, and wherein each sensor device includes one or more sensors operative to sense activity in a living space and includes a processor operative to perform operations comprising:
    detecting an activity in the living space;
    determining contextual routine information, wherein the contextual routine information comprises a pattern of a type of the activity, a location of the activity, a time of the activity;
    determining user care protocol information, wherein the user care protocol information comprises an average time a person spends in the location of the activity;
    determining an occurrence of an adverse health event based at least in part on a current amount of time that the person has spend in the location of the activity;
    comparing the current amount of time that the person has spend in the location of the activity to a plurality of predetermined thresholds, wherein each predetermined threshold corresponds to a degree of adversity;
    generating a flag based at least in part on the comparing of the current amount of time and plurality of predetermined thresholds, wherein the flag indicates the degree of adversity; and
    in response to the occurrence of the adverse health event, the processor of each sensor device is operative to perform further operations comprising one or more of:
        sending a notification to one or more destinations based on the adverse health event; and
        activating one or more surveillance devices based on the adverse health event.

2. The residential sensor device platform of claim 1, wherein the activity comprises one or more motions of a person in the living space.

3. The residential sensor device platform of claim 1, wherein the contextual routine information is associated with the detected activity.

4. The residential sensor device platform of claim 1, wherein the processor is further operative to perform operations comprising determining a type of the detected activity based on one or more motions.

5. The residential sensor device platform of claim 1, wherein the processor is further operative to perform operations comprising exchanging activity information with other sensor devices of the plurality of sensor devices.

6. The residential sensor device platform of claim 1, wherein the user protocol information comprises routine information.

7. The residential sensor device platform of claim 1, the adverse health events may include a person breaking his or her routine.

8. An electrical switch sensor device comprising:
one or more sensors operative to sense an activity in a living space;
a processor operative to perform operations comprising:
detecting an activity in the living space;
determining contextual routine information, wherein the contextual routine information comprises a pattern of a type of the activity, a location of the activity, a time of the activity;
determining user care protocol information, wherein the user care protocol information comprises an average time a person spends in the location of the activity;
determining an occurrence of an adverse health event based at least in part on a current amount of time that the person has spend in the location of the activity;
comparing the current amount of time that the person has spend in the location of the activity to a plurality of predetermined thresholds, wherein each predetermined threshold corresponds to a degree of adversity;
generating a flag based at least in part on the comparing of the current amount of time and plurality of predetermined thresholds, wherein the flag indicates the degree of adversity; and
in response to the occurrence of the adverse health event, the processor is operative to perform further operations comprising one or more of:
sending a notification to one or more destinations based on the adverse health event; and
activating one or more surveillance devices based on the adverse health event.

9. The sensor device of claim 8, wherein the activity comprises one or more motions of a person in the living space.

10. The sensor device of claim 8, wherein the contextual routine information is associated with the detected activity.

11. The sensor device of claim 8, wherein the processor is further operative to perform operations comprising determining a type of the detected activity based on one or more motions.

12. The sensor device of claim 8, wherein the processor is further operative to perform operations comprising exchanging activity information with other sensor devices of a plurality of sensor devices.

13. The sensor device of claim 8, wherein the user protocol information comprises routine information.

14. The sensor device of claim 8, the adverse health events may include a person breaking his or her routine.

15. A computer-implemented method for operation of a residential electrical switch sensor device platform, the method comprising:
detecting an activity in a living space;
determining contextual routine information, wherein the contextual routine information comprises a pattern of a type of the activity, a location of the activity, a time of the activity;
determining user care protocol information, wherein the user care protocol information comprises an average time a person spends in the location of the activity;
determining an occurrence of an adverse health event based at least in part on a current amount of time that the person has spend in the location of the activity;
comparing the current amount of time that the person has spend in the location of the activity to a plurality of predetermined thresholds, wherein each predetermined threshold corresponds to a degree of adversity;
generating a flag based at least in part on the comparing of the current amount of time and plurality of predetermined thresholds, wherein the flag indicates the degree of adversity; and
in response to the occurrence of the adverse health event, the method further comprises one or more of:
sending a notification to one or more destinations based on the adverse health event; and
activating one or more surveillance devices based on the adverse health event.

16. The method of claim 15, wherein the activity comprises one or more motions of a person in the living space.

17. The method of claim 15, wherein the contextual routine information is associated with the detected activity.

18. The method of claim 15, further comprising determining a type of the detected activity based on one or more motions.

19. The method of claim 15, further comprising exchanging activity information with other sensor devices of the plurality of sensor devices.

20. The method of claim 15, wherein the user protocol information comprises routine information.

* * * * *